April 7, 1953 — L. P. FRIEDER ET AL — 2,634,155
MECHANICAL LOAD RELEASE FOR PARACHUTES AND THE LIKE
Filed Nov. 23, 1945 — 4 Sheets-Sheet 1
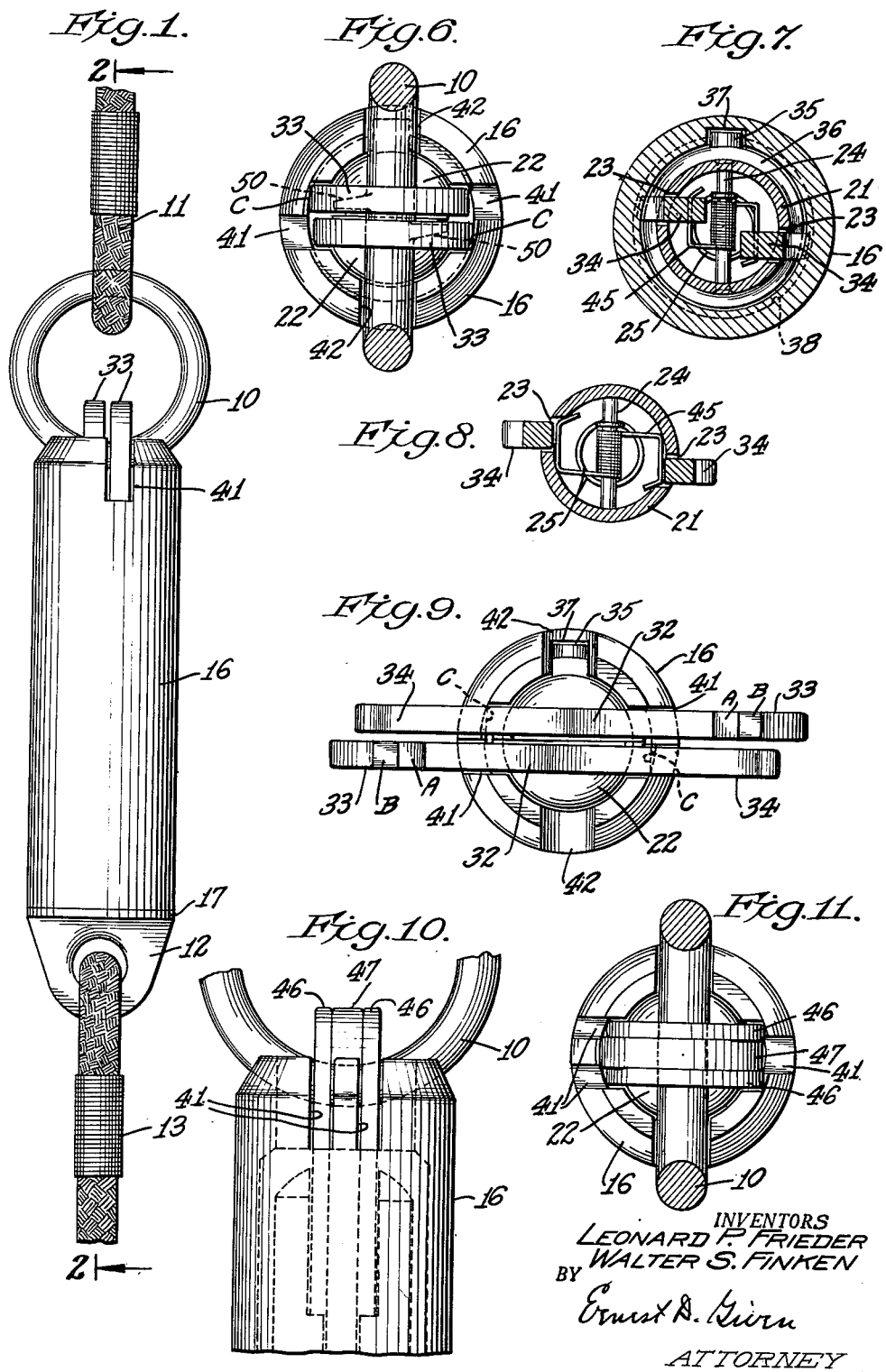
INVENTORS
LEONARD P. FRIEDER
WALTER S. FINKEN
BY
ATTORNEY April 7, 1953     L. P. FRIEDER ET AL     2,634,155
MECHANICAL LOAD RELEASE FOR PARACHUTES AND THE LIKE
Filed Nov. 23, 1945     4 Sheets-Sheet 2
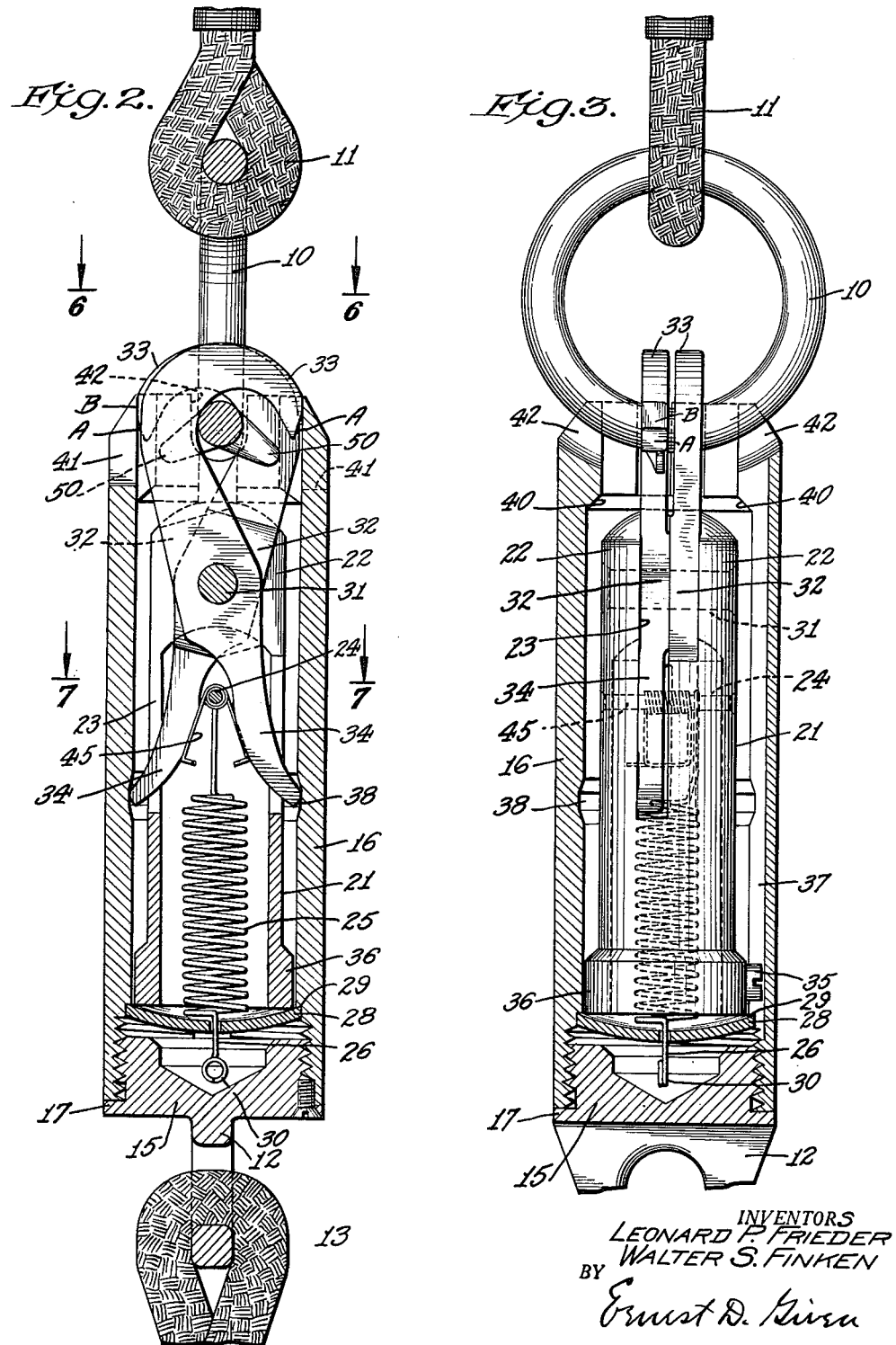
INVENTORS
LEONARD P. FRIEDER
WALTER S. FINKEN
BY
Ernest D. Given
ATTORNEY

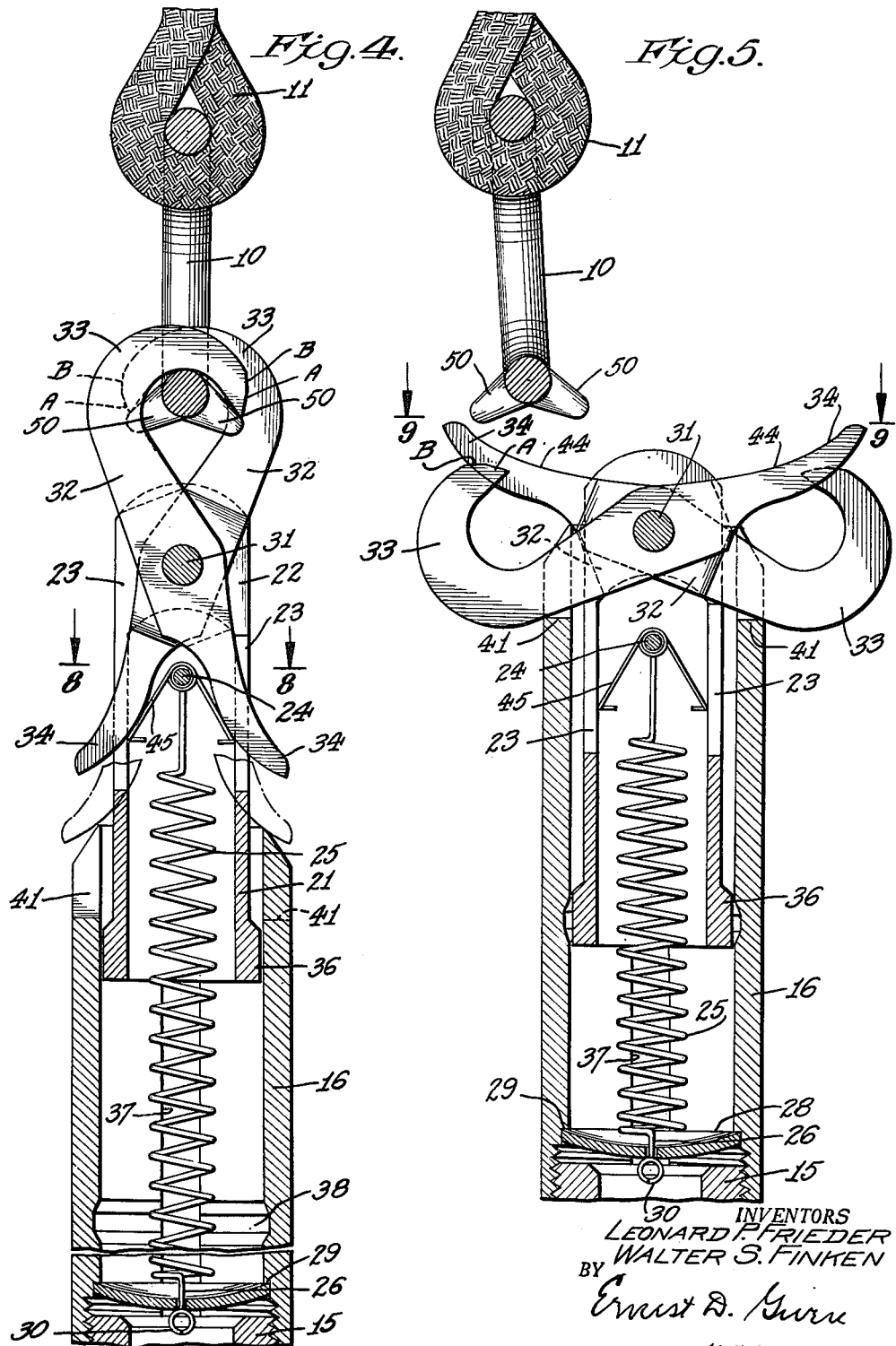

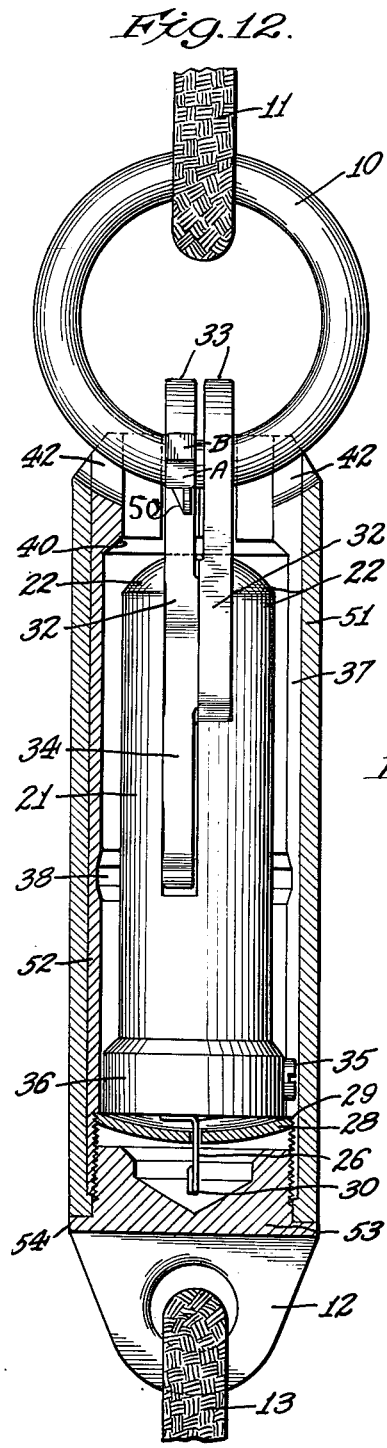
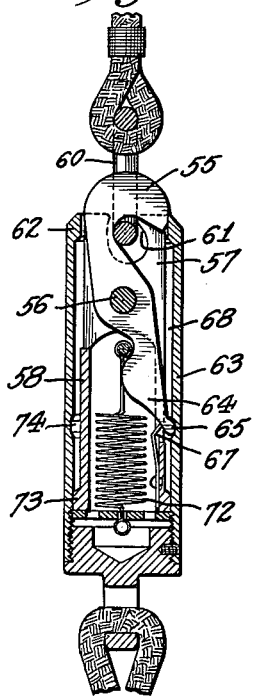
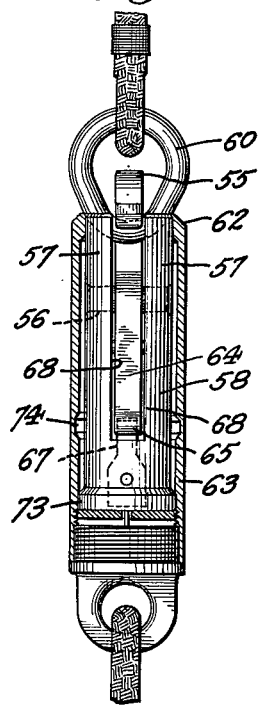
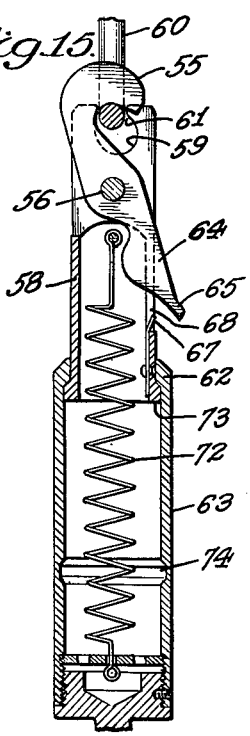
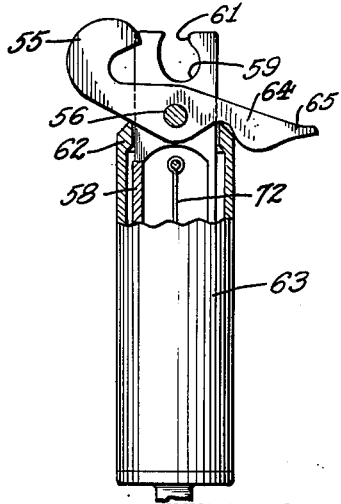

Patented Apr. 7, 1953

2,634,155

UNITED STATES PATENT OFFICE

2,634,155

MECHANICAL LOAD RELEASE FOR PARACHUTES AND THE LIKE

Leonard P. Frieder, Great Neck, and Walter S. Finken, Brooklyn, N. Y., assignors, by mesne assignments, to Reconstruction Finance Corporation, Philadelphia, Pa., a corporation of the United States Application November 23, 1945, Serial No. 630,468

21 Claims. (Cl. 294—83)

This invention relates generally to parachutes and other supporting devices and their use in dropping loads of various kinds and has particular reference to means for connecting and disconnecting parachutes or other devices and their loads.

A main object of the invention is to provide a new and highly useful means for attaching a parachute to a load which may be conveniently operated to make the connection; and which will function automatically to disconnect the parachute from the load as soon as the load has been landed. This prevents the parachute from dragging the load and causing damage to the load. The device works equally well when the load lands on the ground or in the water. Aside from avoiding damage it usually is important that the load remain where it lands. In modern practice, parachute loads can be dropped where intended with surprising accuracy, but heretofore wind acting on the sail of the parachute might drag the grounded load to a location which could not be safely reached, as in the case of dropping military supplies, or if the load is a mine dropped in water, wind and water currents acting on the sail of the parachute may prevent accurate work in sowing mine fields in enemy waters. The device has an important field of usefulness where loads are dropped on ice, as, for example, on lakes in northern countries, as the parachute is prevented from acting as a sail dragging the load over the ice.

An important advantage of a device constructed according to the invention is that it acts to absorb or minimize the initial shock which occurs when a parachute opens to assume support of the load. This not only serves to protect the load and relieve the sail of the parachute from stresses which might be damaging, but it makes possible a lighter construction of connecting and releasing mechanism than would be permissible if the yielding or shock absorbing feature should not be employed. In the construction herein disclosed the shock absorbing feature of the device is also availed of to provide an impermanent latch which holds the parts of the mechanism against premature or accidental disturbance after the connection has been made and prior to launching the parachute and its connecting load.

Other and more or less incidental objects and advantages of the invention are simplicity of construction and corresponding low cost; certainty of operation in making a dependable connection between the load and the parachute; reliability of operation to make an immediate disconnection of the parachute from the load when the parachute has completed its function; and the adaptability of the invention to use in various sizes, dimensions, and arrangement of the parts according to the weights of the loads to be dropped.

While the apparatus herein disclosed is particularly useful in dropping inanimate loads, it is capable of use in dropping men where a quick and certain way of preventing drag by the sail is desirable. It is not necessary to spill the sail of the parachute or operate manually some connection to release the man from the parachute after he has landed.

Other objects and advantages will become apparent from the description of the invention hereinafter contained, said description being illustrated by the drawings accompanying and forming a part of this specification.

In said drawings:

Fig. 1 is a side elevation of a parachute release embodying the invention;

Fig. 2 is a section on the line 2—2 of Fig. 1;

Fig. 3 is another section through the device of Fig. 1, but is taken at a right angle to the section of Fig. 2;

Fig. 4 is the same as Fig. 2 except that the parts are shown in a different position;

Fig. 5 shows the mechanism after it has been operated to release the parachute;

Fig. 6 is a top view along the line 6—6 of Fig. 2;

Fig. 7 is a section along the line 7—7 of Fig. 2;

Fig. 8 is a detail similar to Fig. 7 but with the parts in different positions;

Fig 9 is a view along the line 9—9 of Fig. 5;

Figs. 10 and 11 show respectively a side view and a top view of a modification which is hereinafter explained in detail;

Fig. 12 is a section illustrating a particular way of constructing the outer shell or casing of the release mechanism;

Figs. 13 and 14 are sectional views illustrating a modified embodiment of the invention; and Figs. 15 and 16 illustrate the operation of the modification illustrated in Figs. 13 and 14.

The device shown in Figs. 1 to 11 inclusive of the drawings is intended to be connected at one end to the load and at the other end to a parachute. In the form shown, a load ring 10 is held by a loop in one or more cords 11 connected in turn to or extending from the shroud lines (not shown) of a parachute. In this specification and in at least some of the claims, the term "load ring" is used, but it is not intended to exclude other satisfactory substitutes for such a ring. The lower end of the device has, in the form illustrated in the drawings, a perforated lug or ear 12 to which the load may be attached by a cord 13 or any other convenient means.

The lug 12 is part of a unit 15 which is screwed into the lower end of a cylindrical shell 16. Preferably it has a flange 17 making an airtight seal against the lower end of the shell.

Slidably mounted in the interior of the shell is a hollow piston 21 which is slotted down from its top to provide lugs 22 at the top of the piston and slots 23 in the side walls of the piston. Extending across the interior of the piston is a rod 24 to which is attached one end of a coiled wire spring 25. The lower end of the spring wire has an extension 26 extending through a hole in a cup-shaped disc 28 which is pressed into the lower end of the shell 16 and against a shoulder 29 on the interior of the shell. A loop 30 on the lower end of the extension prevents the spring from being withdrawn. The extension 26 is long enough to permit a certain amount of upward or outward movement of the piston 21 before the loop engages the disc 28, but further upward movement of the piston tensions the spring for a purpose hereinafter made clear.

Supported between the lugs 22 of the piston is a rod 31. In the preferred embodiment this rod constitutes a pivot for two elements 32 which are constructed at their upper ends to form opposed hooks 33 (usually referred to herein as sister hooks) which may be manually closed to grasp the load ring or corresponding connection to the parachute. The lower ends of the elements 32 are constructed to form curved arms 34 cooperating with the shell of the device in ways hereinafter made clear.

The piston 21 is prevented from turning relative to the shell by the head 35, Fig. 3, of a screw set in an enlarged lower portion 36 of the piston and cooperating with a slot 37 in the shell 16. The portion 36 cooperates with the interior of the shell both to limit the piston to rectilinear movement and stop the outward movement of the piston when the enlargement strikes an internal shoulder 40 within the upper end of the shell. As best shown in Fig. 3, the upper corner of the enlargement 36 and the shoulder 40 are on such angles that they cooperate to center the piston at the end of its outward movement.

On the interior of the shell 16 are recesses or a groove 38 to receive the ends or points of the arms 34 when the device has been manually connected to a parachute and the parts positioned as shown in Fig. 2. To place them in those positions the sister hooks 33 are manually closed around the load ring with the ring held between the shanks of the hooks adjacent to the inner curvatures of the hooks and the piston pushed into the shell as far as it will go, the hooks being firmly grasped and held manually until cam surfaces A on the hooks engage with the upper interior edge of the shell 16. This occurs as the ends or points of the arms 34 reach the upper edges of the recesses or groove 38 and further inward movement of the piston will cause the cam surfaces to seat the points of the arms in the groove 38 as shown in Fig. 2. The flat portions B on the outer surfaces of the hooks will then be tangent to and in close engagement with the interior of the shell. Preferably the interior of the shell is cut away sufficiently to provide flat surfaces for cooperating with the surfaces B on the hooks. When the piston is in its innermost position the load ring 10 will be held within arcuate slots 42 cut across the upper end of the shell 16.

When a parachute is dropped with a load connected to it by the mechanism of this invention, the strain imposed when the parachute opens will draw the piston and all of the parts moving therewith to the position shown in Fig. 4. It will be noted that in that position the ends of the arms 34 are above the upper end of the shell 16. As the piston moved toward that position the wedging action of the load ring against the inner surfaces of the sister hooks tended to force the hooks apart and this tendency forced the lower ends of the arms 34 against the interior of the shell 16 to retard the outward movement of the piston and the parts carried thereby. This friction or drag was accentuated initially as the points of the arms 34 left the recesses or groove 38. This wedging action of the load ring against the inner curvatures of the sister hooks and the resulting frictional drag of the arms 34 against the interior of the shell gives the device the shock absorbing characteristic previously mentioned.

When the piston has been drawn out the full distance the load ring will ride into the inner curvatures of the hooks 33 and cause the ends of the arms to extend beyond the upper edge of the shell (as shown in Fig. 4) and an inward or return movement of the piston will engage the arms with the end of the shell and open the hooks. In order to permit the hooks to be thrown wide open clearances 41 for the hooks are cut in the upper end of the shell. If it could be certain that the load would always drop with the device in a vertical position above the load, gravity could safely be depended upon to return the piston 21 toward its inner position far enough to open the sister hooks. However, to make the operation certain under all conditions, the spring 25 is employed. When the parts are drawn outwardly to the position in which they are shown in Fig. 4, the spring 25 becomes tensioned and as soon as the load has landed that spring retracts the piston. It is this retracting movement which engages the arms 34 with the top edge of the shell and moves the arms and sister hooks to the positions in which they are shown in Fig. 5. In order to prevent the sister hooks from accidentally engaging the load ring 10 after the hooks have opened, the curved edges 44 of the arms 34 are so constructed that they will be above the points of the sister hooks and serve as guides which prevent the load ring from engaging the hooks.

In order to make certain that the sister hooks are thrown apart far enough for the arms 34 to extend beyond the upper end of the shell 16 a spring 45 is employed. It is coiled around the rod 24 and has extensions engaging with the arms 34. When the device is being operated to connect a load and the parachute this spring is tensioned and when the arms 34 clear the shell 16, the spring throws the arms outwardly so that when the piston is retracted both of the arms are sure to engage the end of the shell and throw the sister hooks wide open.

When the piston 21 starts to move from the position in which it is shown in Fig. 2 toward the position in which it is shown in Fig. 4, the load ring 10 is almost immediately disengaged from the arcuate slots 42 in the upper end of the shell 16. The load ring may, therefore, rotate relative to the sister hooks, or the load and the sister hooks may rotate relative to the load ring sufficiently to neutralize in part the wedging effect of the load ring against the interior surfaces of the hooks, thereby decreasing the frictional drag of the arms 34 against the interior of the shell 16 and adversely affecting the shock absorbing function of the apparatus. This may be prevented by using a special load ring with integral ears or wings 50, Fig. 5, engaging the flat sides of the sister hooks as best shown in Figs. 4 and 6. These wings or ears, of course, hold the load ring and the sister hooks in the right relation to get the maximum wedging effect of the load ring against the interiors of the hooks.

The construction shown in Figs. 10 and 11 is the same in all respects as the one above described, except that a pair of sister hooks 46 are employed with their points or curved portions extending in the same direction and with an opposing sister hook 47 pivoted between them. This modification has an advantage in that the two sister hooks and the intermediate hook will cooperate in such a way that relative rotation of the load ring and the sister hooks is prevented. The disadvantages of such relative rotation have been mentioned above in connection with constructions employing the single opposed hooks.

If the shell 16 is made of a soft metal it is necessary to protect the interior of the shell against cutting by the points of the arms 34. The frictional pressure applied by the arms to the interior of the shell is very severe and one or two uses of the device might groove the interior of the shell to such an extent as to render the apparatus unreliable in further operations. In Fig. 12 there is shown a construction in which an outer shell 51 is composed of aluminum and an inner lining member 52 of steel or other hard material which will resist the cutting, or grooving action of the points of the arms 34. The lower end of the member 52 engages a shoulder on the interior of the part 51 and is threaded internally to cooperate with threads on a member 53 having a flange 54 cooperating with the outer shell 51 to hold the lining member against relative upward movement. In other respects the construction and operation of the device shown in Fig. 12 is the same as that previously described in connection with the other figures of the drawings.

The modification illustrated in Figs. 13, 14, 15 and 16 employs a wedging effect by the load ring to create a satisfactory frictional resistance and resulting shock absorbing effect while, at the same time, being comparatively simple in its construction and operation. It employs a single hook 55 pivoted on a rod 56 supported between lugs 57 formed by slotting a hollow piston 58 down from its top. The tops of these lugs are cut out or shaped as best shown in Figs. 15 and 16 to provide recesses 59 to receive the load ring 60. These recesses are formed at one side to provide projections 61 which serve to hold the load ring against the shank of the hook 55 adjacent the inner curvature of the hook with the outer edge of the hook in engagement with a shoulder or lip 62 around the upper interior of the sleeve or shell 63 in which the movable parts are mounted.

Stress applied when the parachute opens will cause the load ring to wedge between the projections 61 and the inner surface of the hook, thereby causing an arm 64 integral with the hook to frictionally engage the interior of the shell 63 with a heavy frictional drag to give the desired shock absorbing action.

When the piston has moved out far enough for the point 65 of the arm 64 to clear the upper end of the shell 63, the wedging action of the ring against the hook will be relieved and the load will then be suspended by the inner curvature of the hook. A leaf spring 67 is provided which insures projecting the arm 64 out through a slot 68 in the piston far enough for the end 65 to extend beyond the top of the wall of the shell 63. A spring 72 serving the same general purpose as the spring 25 in the other form of the device draws the piston back into the shell 63 as soon as the load has landed, thereby throwing the hook to the open position in which it is shown in Fig. 16. As illustrated in Fig. 13 it is preferred to have the spring 72 under some tension at all times, this tension being increased as the piston 58 is drawn out to the position in which it is shown in Fig. 15.

The modified form just described does not require any guiding mechanism such as the screw head 35 and slot 37 (Fig. 3) because the piston and the parts carried thereby operate just as well in any angular position of the piston with respect to the outer shell. In addition, the piston is guided or held at all points in its movement by the internal shoulder 62 acting against the wall of the piston and a flange or extension 73 on the piston cooperating with the interior wall of the shell 63.

A groove 74 on the interior of the shell 63 cooperates with the point or tail of the arm 64 to serve as a temporary latch for the parts, this latching effect being insured by the spring 67. As the point 65 of the arm 64 leaves the internal groove 74 there is an instantaneously applied and very substantial friction between the point of the arm and the interior of the shell which is very efficient in absorbing the initial shock.

In respects other than those specifically mentioned, the construction illustrated in Figs. 13 to 16 inclusive, is very similar to that which has previously been described.

Although the invention has been described with reference to parachutes, it will be manifest that the apparatus disclosed is perfectly adapted for many other uses where the requirements are analogous, and is in fact useful for connecting and disconnecting a load and any type of support from which force may be exerted on a load.

While the embodiments of the invention shown in the drawings and hereinabove described are admirably adapted to fulfill the objects in view, it will be apparent to those skilled in the art that various changes and modifications may be made, all coming within the scope of the claims which follow.

What is claimed is:

1. A device for the purpose stated comprising a sleeve and means on the lower end of the sleeve for attaching a load, a sliding member in said sleeve and means for limiting movements of said member in and out relative to the sleeve, a pair of sister hooks pivoted on the upper end of said member for engaging the load ring of a support, and an arm rigid with each of the hooks and cooperating with the interior of the sleeve to hold the hooks closed with the load ring held between the shanks of the hooks when the sliding member is in its inner position, said arms being dimensioned to clear the end of the sleeve when the member is in its outer position, the inner curvatures of the hooks being shaped to be wedged outwardly by the load ring for rocking the hooks outwardly of each other through a predetermined angle about their pivot, to swing the arms over the end of the sleeve upon movement of the slidable member to its outer position, said arms being constructed and arranged to engage, in their said outwardly swung position, the end of the sleeve upon inward movement of the member, for throwing the sister hooks open to disengage the load ring, said hooks being adapted to remain in closed engagement with the load ring when the slidable member is in its outward position, so long as load supporting force is exerted on the hooks by the ring.

2. A device for the purpose stated comprising a sleeve and means on the lower end of the sleeve for attaching a load, a sliding member in said sleeve and means for limiting movements of said member in and out relative to the sleeve, a pair of sister hooks pivoted on the upper end of said member for engaging the load ring of a support, an arm rigid with each of the hooks and cooperating with the interior of the sleeve to hold the hooks closed with the load ring held between the shanks of the hooks when the sliding member is in its inner position, said arms being dimensioned to clear the end of the sleeve when the member is in its outer position, the inner curvatures of the hooks being shaped to be wedged outwardly by the load ring for rocking the hooks outwardly of each other through a predetermined angle about their pivot, to swing the arms over the end of the sleeve upon movement of the slidable member to its outer position, said arms being constructed and arranged to engage, in their said outwardly swung position, the end of the sleeve upon inward movement of the member, for throwing the sister hooks open to disengage the load ring, and a return spring for effecting a return movement of said member.

3. A device for the purpose stated comprising a sleeve and means for attaching a load to the lower end of said sleeve, a sliding member in said sleeve and means for limiting the movements in the sleeve, a pair of sister hooks pivoted on the upper end of said member for engaging the load ring of a support, means including parts carried by the hooks and urged against the interior of the sleeve in response to load stress between the load ring and the hooks for retarding the movement of the sliding member outward when said member is pulled out by stress applied through the load ring to the sister hooks, said hooks comprising structure engaged by the load ring for shifting said parts to a predetermined sleeve-free position upon movement of the member to outermost position under said load stress, said parts being constructed and arranged to be engaged by the sleeve for opening the hooks upon inward return of the member in response to relief of the stress.

4. A device for the purpose stated comprising a sleeve, a member slidable in said sleeve, a pair of sister hooks pivoted on the upper end of said member for engaging the load ring of a support, and arms rigid respectively with the hooks and extending from said pivot inwardly against the interior of the sleeve to hold the hooks closed with the load ring held between the shanks of and adjacent the inner curvatures of the hooks while the slidable member is in its innermost position, the inner curvatures of the hooks being shaped to be wedged outwardly by the load ring to rock the hooks around the pivot for forcing the arms against the interior of the sleeve with increased frictional drag, upon exertion of load force by the load ring on the hooks to draw the member outward, said hooks being further shaped to remain in closed engagement with the load ring when the slidable member is in its outward position, in response to continuing exertion of load supporting force on the hooks by the ring.

5. A device as described in claim 4 in which the arms are shaped and positioned relative to the hooks, to move clear of the sleeve upon movement of the member to outer position, said inner curvatures of the hooks being shaped to be further wedged outwardly by the load ring to swing the arms over the end of the sleeve in response to arrival of the member in outer position, said arms being disposed to be engaged by the end of the sleeve for swinging the hooks open, upon return inward movement of the member.

6. In a device of the character described, a parachute having a load ring, a cylindrical shell, a piston slidable in and out of the shell, means for limiting the movements of the piston in both directions, members pivoted together in crossed relation on the upper end of the piston constructed to provide sister hooks on the upper ends and curved arms at the other ends of the members, the construction being such that the sister hooks are held closed with the ends of the arms and points of the hooks in close frictional engagement with the inner wall of the shell when the hooks are manually closed to engage the load ring and the cylinder is pushed into the shell, the surfaces of the sister hooks engaged by the load ring being so constructed that the pull of the load on the ring will tend to open the hooks and cause an increased friction between the ends of the arms and the interior of the shell retarding outward movement of the piston until the ends of the arms clear the shell, whereupon the ends of the arms are spread apart over the end of the shell, and a spring acting between the piston and the shell to withdraw the piston into the shell when the load is grounded and thereby engage the arms with the end of the shell to spread the arms farther apart and thereby open the sister hooks to free them from the load ring.

7. A device for connecting and disconnecting a support and a load to be dropped by the support comprising a sleeve, means on the sleeve to which a load may be attached, a member slidable to and fro in the sleeve, means for limiting the extent of movement of the member in each direction, a pair of sister hooks pivoted together on the upper end of said member manually operable to close them to grasp the load ring of the support, an arm rigid with each of the hooks, said arms cooperating with the interior of the sleeve to hold the hooks closed when the slidable member is thrust into the sleeve with the hooks closed and the inner surfaces of said hooks being so constructed that load stress between the load ring and the hooks will increase the frictional engagement of the ends of the arms with the interior of the sleeve when said member is moved outward by such stress and cause said arms to spread apart beyond the confines of the sleeve when their ends are free of the sleeve, a spring for retracting the slidable member into the sleeve when the load stress on the hooks is relieved and thereby engaging the arms with the end of the sleeve to spread the arms farther apart and throw open the hooks to disengage them from the support load ring and position the arms to guide the load ring clear of the points of the hooks.

8. A device for connecting a support to a load which is to be dropped and automatically disconnecting the support when the load has landed, comprising a sleeve member to one end of which the load may be attached, a recess on the interior of the sleeve, a piston having a limited movement to and fro in said sleeve, a pair of sister hooks pivoted on the upper end of the piston and manually operable to hook them around the load ring of the support, an arm rigid with each hook and extending below the pivot for the hooks, the construction being such that when the piston is in its innermost position in the sleeve the points of the hooks will be in frictional engagement with the interior of the sleeve with the load ring grasped between the shanks of the hooks adjacent the inner curvatures of the hooks and the ends of the arms will be engaged with the aforesaid recess whereby the pull of the load on the load ring will cause the ring and the curvatures of the hooks to cooperate to increase the friction between the ends of the arms and the interior of the sleeve as said ends leave said recess and until the said ends clear the sleeve, whereupon the curvatures of the hooks and the ring will cooperate to project the ends of the arms outward over the end of the sleeve, return of the piston toward its innermost position then causing the arms to engage the end of the sleeve and thereby throw the sister hooks open to disengage their curved faces from the load ring, a spring tensioned by outward movement of the piston to effect return movement of the piston, and a spring biased by closing the hooks around the load ring to swing the ends of said arms outward as said ends clear the end of the sleeve.

9. A device for the purpose stated comprising a sleeve, means on the lower end of the sleeve for attaching a load, a sliding member in said sleeve having a recess at its upper portion, means limiting the outward movement of said member, a hook pivoted on the upper end of the sliding member manually operable to close the mouth of the recess in the sliding member to receive a load ring, an arm rigid with the hook, a groove around the interior of the sleeve to receive the end of said arm when the sliding member is in its innermost position acting as a temporary latch, spring means to press the end of the arm in to the groove to effect the latching, said hook and spring having configurations cooperating with the load ring when a load is applied, to press the arm into frictional engagement with the interior of the sleeve while the arm is within the sleeve, and said arm being adapted to swing outward over the end of the sleeve as the sliding member approaches its outermost position, whereby upon relief of the load the arm is adapted to engage the end of the sleeve and pivot the hook open to release the load ring from the hook and recess.

10. A device of the character described, comprising a shell, a piston in said shell, hook means pivoted on the upper end of the piston for releasable engagement with the load ring of the support, said shell cooperating with the hook means to hold the ring against the shank structure of the hook means adjacent the inner curvature of the hook means in such manner that the ring will have a wedging action against the hook means when the support assumes support of the load, arm means integral with the hook means held against the interior of the shell by the aforesaid wedging action against the hook means to retard outward movement of the piston until the arm means clears the shell, spring means acting against said arm means to swing said arm over the end of the shell and spring means rendered effective by landing the load for retracting the piston to engage said arm means with the end of the shell and thereby turn the hook means sufficiently about its pivot to disengage it from the load ring, said hook means being shaped to remain in engagement with the load ring when the piston is in its outermost position, so long as the load is supported by the load ring.

11. A releasable device for separably connecting two parts which respectively constitute a load and means for exerting load supporting force on the load to suspend said load, comprising a sleeve adapted to be connected to one of said parts, a connecting member disposable beyond one end of the sleeve and adapted to be connected to the other of said parts, a member telescopically sliding in the sleeve, said sleeve having limiting means for arresting the sliding member in displacement toward the connecting member at a predetermined position, hook means connected to one of the members and releasably engaging the other of the members, said hook means being movable into the sleeve when the sliding member is retracted from said position, said sleeve positively holding the hook means in engaged condition when said hook means is disposed therein, means releasable in response to load-supporting force between said parts for impermanently retaining the hook means in the sleeve, so that under said force the hook means is pulled from the sleeve to the position where the limiting means arrests the sliding member, said hook means being shaped to remain in engaged condition at said last mentioned position so long as the force is exerted, and means responsive to relief of the force for disengaging the hook means while it is out of the sleeve.

12. A device as described in claim 11 wherein the hook means and the interior of the sleeve have cooperating surfaces shaped to press the hook means preliminarily against the interior of the sleeve when the aforesaid force is first exerted on said hook means to pull it from the sleeve, so that shock-opposing frictional resistance is interposed between the aforesaid two separably connected parts upon initiation of said force.

13. A device as described in claim 12 wherein the hook means has member-engaging surfaces shaped to be wedged laterally by the engaged member when the aforesaid force is first exerted between the aforesaid parts, for effectuating the aforesaid preliminary pressure of the hook means against the sleeve.

14. A releasable device for separably connecting two parts which respectively constitute a load and means for exerting load supporting force on the load to suspend said load, comprising a sleeve adapted to be connected to one of said parts, hook means telescopically sliding into and out of the sleeve and adapted for releasably engaging the other of said parts in hooked relation thereto, limiting means associated with the sleeve for arresting the hook means in displacement out of the sleeve at a predetermined position, said hook means including means laterally shiftable for effecting and releasing the aforesaid hooked engagement, said sleeve positively holding said shiftable means in position for said engagement when the hook means is disposed in the sleeve, said sleeve having means cooperating with said shiftable means and releasable in response to load-supporting force between said parts for impermanently retaining the hook means in the sleeve, so that under said force the hook means is pulled from the sleeve to the position where it is arrested by the limiting means, said hook means being shaped to remain in engaged condition at said last mentioned position so long as the force is exerted, and means responsive to relief of the force and cooperating with said shiftable means to shift the latter for disengaging the hook means while it is out of the sleeve.

15. The device described in claim 14 wherein the laterally shiftable means includes rigid tail means extending rearwardly of the hook means, and wherein the means for impermanently retaining the hook means in the sleeve comprises a recess in the inner surface of the sleeve into which said tail means is adapted to fit, said hook means being shaped for frictional abutment of the tail means with the recess when the hook means is pulled out of the sleeve, to prevent such displacement of the hook means except upon exertion of at least a predetermined force thereon.

16. A releasable device for separably connecting two parts which respectively constitute a load and means for exerting load supporting force on the load to suspend said load, comprising a sleeve adapted to be connected to one of said parts, a hook-engageable member adapted to be connected to the other of said parts, hooks means telescopically sliding into and out of the sleeve and adapted for releasably engaging said member in hooked relation thereto, limiting means for arresting the hook means in displacement out of the sleeve at a predetermined position, said hook means comprising means of hook-shaped configuration pivoted to move inwardly and outwardly of a condition of engagement with the aforesaid member, said sleeve positively holding said pivoted means in condition of engagement when the hook means is disposed in the sleeve, said pivoted means having its hook-shaped configuration eccentrically disposed relative to the pivot thereof when the hook means is disposed in the sleeve, so that exertion of force by the member on the hook means to pull the latter from the sleeve wedges the pivoted means in outwardly moving direction, said configuration being shaped to permit limited outward movement of said pivoted means to a stable condition of engagement with the member when the hook means is drawn from the sleeve to the predetermined position, said hook means being thereby adapted to remain in engaged condition with the member at said position so long as the force is exerted, and means responsive to relief of the force and operable only when said pivoted means is out of the sleeve and has effected said limited outward movement, for disengaging the hook means from the member.

17. The device described in claim 16 wherein the disengaging means comprises tail means forming part of said pivoted means and adapted to project laterally beyond the sleeve when the pivoted means has effected said limited movement, and means biased to withdraw the hook means toward the sleeve when the load supporting force is relieved, said tail means being thereby adapted to engage the end of the sleeve and move the pivoted means to open, non-engaging condition.

18. A releasable device for separably connecting two parts of a system under load supporting force, comprising a sleeve adapted to be connected to one part of the system, hook means telescopically sliding into and out of the sleeve and adapted for releasably engaging a member at the other part of the system in hooked relation thereto, limiting means for arresting the hook means in displacement out of the sleeve at a predetermined position, said hook means comprising means of hook-shaped configuration pivoted to move inwardly and outwardly of a condition of engagement with the aforesaid member, said sleeve positively holding said pivoted means in condition of engagement when the hook means is disposed in the sleeve, said pivoted means having its hook-shaped configuration eccentrically disposed relative to the pivot thereof when the hook means is disposed in the sleeve, so that exertion of force by the member on the hook means to pull the latter from the sleeve wedges the pivoted means in outwardly moving direction, said pivoted means including surface means disposed to abut the inner surface of the sleeve when the hook means is in the latter, for translating said wedging force on the hook means into frictional pressure between the hook means and the sleeve as the hook means is pulled from the sleeve, said pivoted means being adapted to assume a stable condition of engagement with the member upon withdrawal of the hook means to said predetermined position and so long as the load-supporting force is exerted, and said pivoted means being adapted to move to disengaged condition upon relief of the load supporting force when the hook means is out of the sleeve.

19. A releasable device for separably connecting two parts of a system under load supporting force, comprising a sleeve adapted to be connected to one part of the system, pivoted hook means telescopically sliding into and out of the sleeve and adapted for releasably engaging a member at the other part of the system, said hook means including tail means forming part thereof and movable about the pivot therewith, limiting means for arresting the hook means in displacement out of the sleeve at a predetermined position, said sleeve positively holding said hook means in engaged condition when the hook means is disposed in the sleeve, said hook means and the tail means thereof being adapted to be pulled from the sleeve to the aforesaid predetermined position upon exertion of load supporting force by the member, said hook means being shaped to remain engaged with the member at said position so long as the force is exerted, and means responsive to relief of the force when the hook means and its tail means are out of the sleeve for displacing the tail means against the end of the sleeve, to disengage the hook means from the member.

20. The device described in claim 19 wherein the inner surface of the sleeve has a sloping-sided recess adapted to engage the tail means for impermanently holding the hook means in the sleeve, said hook means having an outer hook surface configuration providing a region of abutment with the inside of the sleeve so that when the hook means is pulled outwardly of the sleeve, the tail means is preliminarily frictionally pressed against the sloping side of said recess, to provide resistance against withdrawal of the hook means, said hook surface having a further inwardly sloping configuration for relieving said pressure as the tail means moves out of the recess, to permit easier outward displacement of said hook means after said preliminary frictional resistance.

21. In apparatus of the character described, in combination, a sleeve, a piston slidable in said sleeve and having one end adapted to project out of the sleeve beyond a corresponding end of the latter, a supporting member disposed in axial alignment with the sleeve and piston at a locality beyond the aforesaid end of the sleeve, limiting means associated with the sleeve for arresting the piston in displacement of its aforesaid end out of the sleeve at a predetermined outward position with the opposite end of the piston retained in the sleeve, said piston carrying displaceable means including at least one hook pivoted on the piston at a predetermined locality adjacent the aforesaid first-mentioned end thereof, for removably engaging the supporting member so that supporting force is transmitted from said member through said displaceable means and piston in series to said sleeve, with the piston thereby pulled to its outer position, said hook having an integral tail portion extending from its pivot in the direction of the aforesaid opposite end of the piston but angularly away from the axis of the sleeve, said tail portion being disposed beyond the aforesaid end of the sleeve when the piston is in its aforesaid outer position and said tail portion being shaped with a cam surface which faces oppositely to the inner curvature of the hook and angularly toward the aforesaid end of the sleeve and which lies in the path of said sleeve relative to the piston, when the hook-including displaceable means is engaging the supporting member, said sleeve and piston being adapted for mutual retraction upon relief of said force between the sleeve and member, and said tail portion being engaged at its cam surface, and moved, by the aforesaid end of the sleeve upon said retraction, to rock the hook for displacement of the displaceable means from engagement with the supporting member.

LEONARD P. FRIEDER.
WALTER S. FINKEN.

REFERENCES CITED

The following references are of record in the file of this patent:

UNITED STATES PATENTS

| Number | Name | Date |
|---|---|---|
| 1,507,706 | Miller et al. | Sept. 9, 1924 |
| 1,536,656 | Bryant | May 5, 1925 |
| 1,845,466 | Williams | Feb. 16, 1932 |
| 2,328,914 | Kubat | Sept. 7, 1943 |
| 2,356,920 | Drescher | Aug. 29, 1944 |
| 2,383,485 | Irby | Aug. 28, 1945 |
| 2,483,044 | Gongwer | Sept. 27, 1949 |
| 2,534,704 | Frieder et al. | Dec. 19, 1950 |

FOREIGN PATENTS

| Number | Country | Date |
|---|---|---|
| 284,150 | Germany | May 10, 1915 |
| 113,858 | Great Britain | Mar. 14, 1918 |